No. 747,483. Patented December 22, 1903.

UNITED STATES PATENT OFFICE.

JAMES RICE, OF DETROIT, MICHIGAN.

PROCESS OF DISINTEGRATING EMERY-WHEELS.

SPECIFICATION forming part of Letters Patent No. 747,483, dated December 22, 1903.

Application filed April 27, 1903. Serial No. 154,507. (No specimens.)

*To all whom it may concern:*

Be it known that I, JAMES RICE, a citizen of the United States of America, residing at Detroit, in the county of Wayne and State of Michigan, have invented certain new and useful Improvements in Processes of Disintegrating Emery-Wheels, &c., of which the following is a specification.

This invention relates to the process of disintegrating emery-wheels, &c., and has for its object to cut or dissolve the cement or binding agent contained in the wheels, so as to permit the particles of emery, corundum, or whatever the old and broken wheels may be composed of to be used over again in the construction of new wheels.

To this end my invention consists in the process more fully herein described and claimed.

The wheels to be treated are first broken up to the desired size and then placed in a suitable vessel capable of withstanding heat and water added—say about fifteen or sixteen pailfuls for every three hundred pounds of broken emery-wheels, and forty to fifty pounds, more or less, caustic soda, lye, or potash added and the whole mass brought to a boil until the wheels are dissolved, the time required varying according to the strength of solution used and hardness of the wheels to be dissolved. After the wheels are dissolved the residue is shoveled from the vessel into a washer, preferably a rotary drum supplied with running water, and thoroughly washed to eliminate all foreign matter and then dried and run through sieves and graded as to fineness, when it is again ready for use. As this emery or corundum varies in price from five to ten cents per pound, it will be seen that the savings affected are enormous in a large plant. In soft wheels they are not broken up before putting in the vessel in order to save the brass wire-netting usually embedded in emery-wheels, and, in fact, it is not necessary to break up any of the wheels except to expedite the process of disintegration.

For the mixture I find that the commercial caustic soda, lye, or potash has about the same action, but that there is considerable difference in their strength and cost when purchased upon the open market, and for the purpose of cheapening the mixture, depending, of course, upon the time in which the wheels must be dissolved, I add more of one ingredient and less of the other. I wish it understood, however, that I claim, broadly, the use of caustic soda, lye, or potash separately or any admixture of them for the purpose of disintegrating emery-wheels, &c.

Having thus fully described my invention, what I claim is—

1. The herein-described process for disintegrating emery-wheels, which consists in first submerging the broken wheels in an alkaline solution, then heating the same until the wheels are disintegrated and then washing, drying and grading the residue.

2. The herein-described process for disintegrating emery-wheels, which consists in submerging the wheels to be disintegrated in a heated solution of caustic soda, lye or potash until disintegrated.

3. The herein-described process for disintegrating emery-wheels, which consists in submerging the wheels to be disintegrated in a heated solution of caustic, lye or potash, in about the proportions specified and then washing, drying and grading the residue.

In testimony whereof I affix my signature in presence of two witnesses.

JAMES RICE.

Witnesses:
OTTO F. BARTHEL,
THOMAS G. LONGSTAFF.